(12) United States Patent
Polesel et al.

(10) Patent No.: US 12,287,229 B2
(45) Date of Patent: Apr. 29, 2025

(54) VOLUME FLOWMETER AND METHOD FOR DETERMINING A VOLUMETRIC FLOW RATE

(71) Applicant: LUXEMBOURG INSTITUTE OF SCIENCE AND TECHNOLOGY, Eschsur-Alzette (LU)

(72) Inventors: Jérôme Polesel, Mexy (FR); Mathieu Gerard, Rehon (FR)

(73) Assignee: LUXEMBOURG INSTITUTE OF SCIENCE AND TECHNOLOGY, Eschsur-Alzette (LU)

(*) Notice: Subject to any disclaimer, the term of this patent is extended or adjusted under 35 U.S.C. 154(b) by 568 days.

(21) Appl. No.: 17/615,892

(22) PCT Filed: Jul. 6, 2020

(86) PCT No.: PCT/EP2020/068982
§ 371 (c)(1),
(2) Date: Dec. 2, 2021

(87) PCT Pub. No.: WO2021/004997
PCT Pub. Date: Jan. 14, 2021

(65) Prior Publication Data
US 2022/0326056 A1  Oct. 13, 2022

(30) Foreign Application Priority Data
Jul. 8, 2019  (LU) ........................... 101 299

(51) Int. Cl.
| | |
|---|---|
| *G01F 1/06* | (2006.01) |
| *G01F 1/10* | (2006.01) |
| *G01F 1/38* | (2006.01) |
| *G01F 15/00* | (2006.01) |

(52) U.S. Cl.
CPC ............ *G01F 1/06* (2013.01); *G01F 1/10* (2013.01); *G01F 1/38* (2013.01); *G01F 15/005* (2013.01)

(58) Field of Classification Search
CPC ..... G01F 1/03; G01F 1/75; G01F 1/10; G01F 1/115; G01F 1/06; G01F 1/075
See application file for complete search history.

(56) References Cited

U.S. PATENT DOCUMENTS

| | | |
|---|---|---|
| 5,370,112 A | 12/1994 | Perkins |
| 6,199,434 B1 | 3/2001 | Cornil |
| (Continued) | | |

FOREIGN PATENT DOCUMENTS

| | | |
|---|---|---|
| FR | 2847339 A1 | 5/2004 |
| WO | 2006104640 A1 | 10/2006 |
| WO | 2006110600 A2 | 10/2006 |

OTHER PUBLICATIONS

Wang Song Hao, "Development of a Digital and Battery-Free Smart Flowmeter", Energies 2014, 7, 2695-3709 (2014).
International Search Report PCT/EP2020/068982 filed Jul. 6, 2020; Mail date Sep. 25, 2020.
Written Opinion of the International Searching Authority PCT/EP2020/068982 filed Jul. 6, 2020; Mail date Sep. 25, 2020.

*Primary Examiner* — Erika J. Villaluna
(74) *Attorney, Agent, or Firm* — CANTOR COLBURN LLP (57) ABSTRACT

An aspect of the present invention pertains to a method for determining the volumetric flow rate of a compressible fluid flow flowing through a volume flowmeter having a flow inlet, a wheel downstream of the flow inlet and a constriction downstream of the flow inlet and upstream of the wheel, the compressible fluid flowing through the flow inlet and actuating the wheel. The method comprises measuring the rotational speed of the wheel and determining the permanent pressure loss across the wheel based on the measured rotational speed. The method further comprises measuring (Continued)

the fluid pressure of the compressible fluid flow at the flow inlet and determining whether the compressible fluid flow in the volume flowmeter is in the subsonic or in the supersonic regime based on the determined permanent pressure loss and the measured fluid pressure. The method also comprises measuring the fluid temperature of the compressible fluid flow at the flow inlet and determining the volumetric flow rate of the compressible fluid flow based on the determined permanent pressure loss, the measured fluid pressure, the regime of the compressible fluid flow and the measured fluid temperature. Other aspects of the present invention pertain to volume flowmeter for determining the volumetric flow rate of a compressible fluid flow, a data processing device for controlling a volume flowmeter, a computer program for the controller and a computer-readable medium having stored thereon the computer program.

20 Claims, 7 Drawing Sheets

(56) References Cited

U.S. PATENT DOCUMENTS

| | | | |
|---|---|---|---|
| 9,671,793 B2 * | 6/2017 | Atherton | G01F 1/74 |
| 2006/0217903 A1 * | 9/2006 | Shajii | G01F 25/17 |
| | | | 702/47 |
| 2008/0281534 A1 | 11/2008 | Hurley | |
| 2011/0298635 A1 | 12/2011 | Yip | |
| 2019/0072420 A1 * | 3/2019 | Nakagaki | G01F 15/063 |
| 2022/0099466 A1 * | 3/2022 | Patil | G01F 1/88 |

* cited by examiner

VOLUME FLOWMETER AND METHOD FOR DETERMINING A VOLUMETRIC FLOW RATE

TECHNICAL FIELD

Aspects of the disclosure relate to a (self-powered) volume flowmeter and a method for determining a volumetric flow rate. Further aspects of the disclosure relate to a data processing device for controlling a volume flowmeter and a computer program for determining a volumetric flow rate.

BACKGROUND

A review of so-called "differential pressure flowmeters" is provided by Th. R. Sifferman, L. J. Kemp, G. V. Chilingarian, "Chapter 2 Flow Rate Measurements", Developments in Petroleum Science 19B, pp. 13-59 (1989). More recently, an intelligent flow measurement technique was proposed by Santhosh K. V., B. K. Roy, "An Intelligent Flow Measurement Technique Using Orifice", IJAPM 2 p. 165 (2012). The intelligent flow measurement technique allows for avoiding recalibration of the flowmeter each time the liquid, pipe and/or the orifice is/are replaced/changed. The flow rate of a fluid in a pipe is computed, among others, from the pressure difference of the fluid between upstream and downstream (specifically downstream at the vena-contracta) regions of an orifice arranged in the pipe.

Flowmeters with a turbine are well known in the context of incompressible fluid flows. For example, a digital and battery-free smart water flowmeter was proposed in W. S. Hao, R. Garcia, "Development of a Digital and Battery-Free Smart Flowmeter", Energies 7, p. 3695 (2014). It should be noted that the temperature and the pressure do not significantly affect the volumetric flow measurement for water (or other incompressible fluids). A Woltman flowmeter design having in addition a coil for supplying power to the flowmeter is therefore suitable for measuring the flow rate of an incompressible fluid. In particular, a microcontroller unit in combination with an anisotropic-magnet-resistance (AMR) sensor may be used for detecting the rotational speed of the permanent magnets of the magnetic rotor. The rotating magnetic rotor induces an electromotive force inside coils of the stator, thereby generating a large amount of electrical power that can be distributed to the different electronic components of the flowmeter. This arrangement and the measurement procedure are not compatible for the measurement of volumetric flow rates of fluids that are subject to expansion effects, e.g. compressible fluids.

Document U.S. Pat. No. 5,370,112 discloses a portable gas dispensing system. Pulsed doses of a respirating gas such as oxygen are supplied to a patient with breathing difficulties. The system is provided with means to generate electricity from energy extracted from the expanding gas. A pneumatic motor, which may be integral with the system dose metering means, is powered by the expanding gas and drives an electrical generator to produce at least the required electrical power for operating the system, thereby allowing for an increase in the service time per fill, a decrease in system weight, or both.

Document US 2011/298635 relates to a self dynamo smart flow utility meter providing self electric energy, real-time wireless data transmission ability and remotely flow control ability. Also, a method and system for flow utility real-time flow usage monitoring and control, self error diagnostic and self leakage monitoring is disclosed.

BRIEF SUMMARY

A first aspect of the disclosure pertains to a method for determining the volumetric flow rate of a compressible fluid flowing through a volume flowmeter having a flow inlet, a wheel downstream of the flow inlet and, preferably, a constriction downstream of the flow inlet and upstream of the wheel, the compressible fluid flowing through the flow inlet and actuating the wheel. The method comprises:

measuring the rotational speed of the wheel;

determining the permanent pressure loss across the wheel based on the measured rotational speed;

measuring the fluid pressure of the compressible fluid flow at the flow inlet;

determining whether the compressible fluid flow in the volume flowmeter (downstream of the constriction) is in the subsonic or in the supersonic regime based on the determined permanent pressure loss and the measured fluid pressure at the flow inlet;

measuring the fluid temperature of the compressible fluid flow at the flow inlet; and determining the volumetric flow rate of the compressible fluid flow based on the determined permanent pressure loss, the measured fluid pressure, the regime of the compressible fluid flow and the measured fluid temperature.

The volumetric flow rate is defined as the volume of fluid which passes a given surface per unit time. The volumetric flow rate is usually denoted by the symbol "Q". The volumetric flow rate is expressed in cubic meters per second ($m^3/s$) in SI units. Depending on the application, other derived units may be used such as liters per second (L/s), liters per minute (L/min) or liters per hour (L/h), when appropriate.

Fluid flows are generally separated into two categories: incompressible fluid flows and compressible fluid flows. In case of incompressible fluid flows, the density of the fluid remains constant along the flow. In addition, when the variations of density along the flow are negligible, then the flow can be accurately approximated as incompressible. In other words, in the case of incompressible fluid flows, the density of the fluid remains constant (or varies in a negligible way) within a parcel of fluid that moves with the flow velocity. On the contrary, in the case of compressible fluid flows, the density of the fluid varies within a parcel of fluid that moves with the flow velocity. It is important to note that an incompressible fluid flow does not necessarily imply that the fluid itself is incompressible.

As used herein, a "wheel" is a rotary mechanical device that is configured for converting kinetic energy of a fluid flow into (mechanical) rotational energy, and may, optionally convert the rotational energy into electric energy. The wheel may be a paddle wheel, a bucket wheel, a helix, or any other type of wheel.

As used herein, a "constriction" is a region having a smaller cross-section than the cross-sections of the flow inlet and of the region where the wheel is located, respectively. The constriction may, e.g., be a nozzle, an orifice and/or a section protruding from the tube guiding the flow.

As used herein, the "permanent pressure loss" is the pressure difference or pressure drop caused by a volume flowmeter. It is the difference between the upstream fluid pressure and the downstream fluid pressure, both measured or determined far away from the volume flowmeter, e.g. at a distance corresponding to at least 4 times, preferably at least 6 times, more preferably at least 8 times the diameter of the flow pipe on which the volume flowmeter is arranged.

It should be noted that the rotational speed, the fluid pressure and the fluid temperature may be expressed and interpreted in any physical units. For example, the fluid pressure may be used in Volts e.g. for further data processing in a controller.

The subsonic and the supersonic regimes correspond to flow regimes where the local fluid flow velocity is lower, respectively greater, than the local speed of sound in the fluid. Generally, in fluid dynamics, the Mach number (M or Ma) can be used for determining whether the flow is in the subsonic or supersonic regime. The Mach number is a dimensionless quantity representing the ratio of local fluid flow velocity to the local speed of sound: $M=u/c$, where u is the local fluid flow velocity and c is the speed of sound in the fluid.

It will be appreciated that the first aspect of the present disclosure greatly simplifies the measurements, in particular the fluid pressure measurements, when compared to the solution proposed in the prior art. Indeed, the solution proposed by the first aspect of the present disclosure alleviates the need of measuring the fluid pressure at vena-contracta (as e.g. in Santhosh K. V., B. K. Roy, "An Intelligent Flow Measurement Technique Using Orifice", IJAPM 2 p. 165 (2012)). Fluid pressure measurements at the vena-contracta may indeed be very challenging. It is indeed very complicated to arrange the pressure sensor (pressure gauge) very close to the orifice. A precise positioning of the pressure sensor is essential for achieving a precise and stable measurement. Also, the location of the vena contracta varies with the orifice-to-pipe diameter ratio and is thus subject to error if the orifice plate is changed.

The first aspect of the present disclosure also allows for improved determination of the volumetric flow rate for compressible fluid flows. Indeed, for compressible fluid flows, the geometry of the pipe on which the flowmeter is arranged may cause a transition of the regime of the flow, e.g. from the subsonic regime to the supersonic regime or vice-versa, which is known to greatly affect the quantitative determination of the volumetric flow rate.

In addition, the first aspect of the present disclosure is more versatile in the sense that the method encompasses the determination of the volumetric flow rate in the case of a subsonic flow and of a supersonic flow.

According to an embodiment, the method comprises powering the volume flowmeter by a battery and/or a supercapacitor.

Preferably, the method comprises powering the volume flowmeter by energy harvested from the compressible fluid flow by a turbine that comprises a generator and the wheel, the wheel being operatively connected to the generator. It follows that the operation of the volume flowmeter may be made independent on external energy sources, or, at least, the required external energy for operating the volume flowmeter is reduced. The operational costs, among others, of the volume flowmeter are thereby reduced.

According to a preferred embodiment, the method comprises charging the battery and/or the supercapacitor with energy harvested by the turbine. The battery and/or the supercapacitor act as a buffer for storing a possible (temporary) excess of harvested energy, i.e. in case the energy harvested from the fluid flow is greater than the energy required for operating the volume flowmeter.

The method may comprise transmitting at least one of the measured rotational speed of the wheel, the measured fluid pressure at the flow inlet and the measured fluid temperature. It will be appreciated that transmitting the measured rotational speed of the wheel, the measured fluid pressure and the measured fluid temperature may allow for remotely determining the permanent pressure loss across the wheel based on the measured rotational speed, the regime of the flow and the volumetric flow rate, thereby reducing the energy consumption of the volume flowmeter.

The method may also comprise transmitting at least one the measured rotational speed of the wheel, the determined volumetric flow rate, the measured pressure, the regime of the compressible fluid flow, the measured fluid temperature and the cumulative volume through the volume flowmeter, and time series thereof. A remote analysis of the time series may be performed, e.g. for calculating the (cumulated) consumption in volume of the fluid, for detecting inlet pressure oscillations or sudden temporal variations of the inlet pressure, thereby detecting possible fluid leaks, fluid contamination and/or monitoring the amount of fluid remaining in a fluid tank, thereby forecasting when a fluid tank replacement will be needed.

As used herein, a "time series" is a series of data points indexed (or listed) in time order.

The time series may evenly or unevenly spaced in time.

In other embodiments, the analysis may be performed locally, i.e. by the volume flowmeter itself.

The method may also comprise transmitting a state of the volume flowmeter. For example, an operational status (e.g. "ON" or "OFF"), a servicing status (e.g. "NEEDS SERVICING"), a servicing information (such as an information pertaining to the wear of the flowmeter). The method may also comprise transmitting an alert message for, e.g., events that need (near) immediate actions (e.g. a suspected leak).

The method may also comprise transmitting geolocation and/or time data, e.g. provided by a GNSS receiver. The volume flowmeter may therefore be readily located. In addition, in case of GNSS provided time data, a global, synchronized, time axis may be defined for, e.g. events and time series, for a plurality of volume flowmeters according to the first aspect of the disclosure.

The transmission may be a wired or a wireless transmission.

The transmission may be a unicast transmission, a multicast transmission, a geocast transmission, an anycast transmission or a broadcast transmission.

The transmission may be effected in compliance with any wireless data transmission protocol, e.g. the Bluetooth protocol, the ZigBee protocol, the Z-wave protocol or the Wi-Fi protocol.

The transmission is preferably effected in compliance with the Bluetooth Low Energy protocol.

The power required for the transmission preferably provided by the turbine.

A second aspect of the disclosure pertains to a volume flowmeter for determining the volumetric flow rate of a compressible fluid flow comprising:
  a flow inlet for the compressible fluid flow, the flow inlet comprising a pressure sensor and a temperature sensor for measuring the fluid pressure and the fluid temperature, respectively, of the compressible fluid flow;
  a wheel, in fluid communication with the flow inlet, preferably via a constriction arranged downstream of the flow inlet and upstream of the wheel, the wheel being configured for being actuated by the compressible fluid flow;
  a rotational speed sensor for measuring the rotational speed of the wheel; and a controller configured for determining:
  the permanent pressure loss across the wheel based on the rotational speed measured by the rotational speed sensor;
  whether the compressible fluid flow in the volume flowmeter is in the subsonic or in the supersonic regime based on the determined permanent pressure loss and the measured fluid pressure by the pressure sensor; and
  the volumetric flow rate of the compressible fluid flow based on the determined permanent pressure loss, the measured fluid pressure by the pressure sensor, the determined regime of the compressible fluid flow and the measured fluid temperature by the temperature sensor.

The volume flowmeter could comprise a wheel bypass arrangement for bypassing the wheel, the wheel bypass arrangement preferably comprises a valve for selectively opening and closing the bypass. Alternatively, the flowmeter could be arranged on a bypass of a valve. The valve may be actuated manually by a user or automatically, e.g. in case of a malfunction of the flowmeter.

According to an embodiment, the wheel is part of a turbine that also comprises a generator. The turbine harvests energy from the energy harvested from the compressible fluid flow for powering the flowmeter. In other words, the volume flowmeter comprises a turbine for powering the flowmeter, the turbine comprising the wheel and a generator, the wheel being configured to be operatively connected to the generator.

According to an embodiment, the volume flowmeter comprises a battery and/or a supercapacitor configured for powering the volume flowmeter.

Preferably, the volume flowmeter comprises a power management system for controlling the electrical components of the volume flowmeter. More specifically, the power management system may be configured for controlling the electrical power generated by the turbine and the electrical power needed by the volume flowmeter to operate. The power management system may determine whether the overall electrical power consumption of the flowmeter is greater or lower than the electrical power generated by the turbine. In the first case, the power management system may complement the generated electrical power by electrical power stored in the battery (and/or supercapacitor) for optimal operation of the volume flowmeter. In the second case, the power management system may redirect the generated electrical power to the buffer battery (and/or supercapacitor) for later use. Alternatively or additionally, the power management system may selectively power on or off components of the volume flowmeter e.g. based on the power consumption of said components and/or a ranking reflecting the relative importance of the components (the power management system may e.g. power off a display or a wireless communication system instead of the temperature sensor in case of low generated and/or stored electrical power).

The volume flowmeter may comprise a wireless communication system, such as, e.g. a Bluetooth, preferably a Bluetooth Low Energy, a ZigBee, a Z-wave or a Wi-Fi communication system.

The volume flowmeter may comprise a GNSS receiver for providing geolocation as well as time data, i.e. the so-called P (position) and T (time) state.

The rotational speed sensor preferably comprises at least one of a phase-locked loop (PLL) control system and a comparator with a digital counter for determining the rotational speed of the wheel. For example, the PLL control system (or the comparator) may be connected to the generator of the turbine so as to monitor the phase and frequency of the current generated by the turbine.

The constriction may, e.g., be a nozzle.

A third aspect of the disclosure relates to a data processing device for controlling (e.g. for managing and/or processing data from) a volume flowmeter, comprising one or more signal input terminals for receiving fluid pressure and fluid temperature signals of a compressible fluid flow at a flow inlet of the volume flowmeter as well as a rotational speed signal of a wheel of the volume flowmeter, and a controller configured for determining:
  the permanent pressure loss across the wheel based on the rotational speed signal;
  whether the compressible fluid flow in the volume flowmeter is in the subsonic or in the supersonic regime based on the determined permanent pressure loss and the fluid pressure signal; and
  the volumetric flow rate of the compressible fluid flow based on the determined permanent pressure loss, the fluid pressure signal, the determined regime of the compressible fluid flow and the fluid temperature signal.

Optionally, the controller could further be configured for determining the incremental consumption in volume of the fluid based on the volumetric flow rate change against time.

A fourth aspect of the disclosure pertains to a computer program comprising instructions to cause a controller for the volume flowmeter according to the second aspect of the disclosure to execute the steps of:
  determining the permanent pressure loss across the wheel based on the measured rotational speed;
  determining whether the compressible fluid flow in the volume flowmeter is in the subsonic or in the supersonic regime based on the determined permanent pressure loss and the measured fluid pressure; and
  determining the volumetric flow rate of the compressible fluid flow based on the determined permanent pressure loss, the measured fluid pressure, the regime of the flow compressible fluid flow and the measured fluid temperature.

A fifth aspect of the disclosure pertains to a (non-transitory) computer-readable medium (e.g. a hard drive, a solid-state drive, a flash drive, etc.) having stored thereon the computer program according to the fourth aspect of the disclosure.

BRIEF DESCRIPTION OF THE DRAWINGS

By way of example, preferred, non-limiting embodiments of the disclosure will now be described in detail with reference to the accompanying drawings, in which.

The reader's attention is drawn to the fact that the drawings are not to scale. Furthermore, for the sake of clarity, proportions between height, length and/or width may not have been represented correctly.

DETAILED DESCRIPTION

Figure 1:
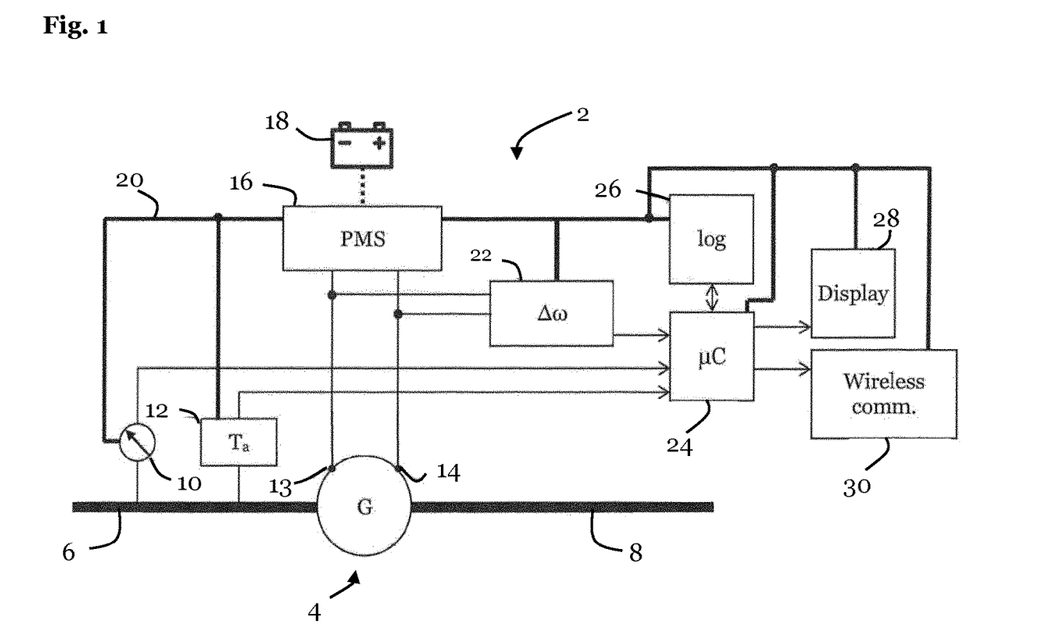
FIG. 1: is a schematic representation of a self-powered flowmeter, according to a preferred embodiment of the disclosure.

FIG. 1 is a schematic representation of a self-powered flowmeter 2, according to a preferred embodiment of the disclosure. The flowmeter 2 comprises a turbine 4 having a flow inlet 6 and a flow outlet 8 configured to be connected to a pipe housing a fluid flow. The fluid flow flows through the turbine 4 from the flow inlet 6 to the flow outlet 8 when the flowmeter 2 is connected to the pipe. The turbine 4 harvests kinetic energy from the fluid flow and transforms it into electrical energy that powers the flowmeter 2. The turbine 4 therefore acts as a power generator. The flow inlet 6 comprises a pressure sensor 10 (e.g. a low consumption pressure gauge, e.g. a MS5541C from TE Connectivity, Servoflo Corporation) and a temperature sensor 12 (e.g. the temperature sensor may be embedded in the low consumption pressure gauge which provides temperature measurement capabilities, e.g. a MS5541C, or the temperature sensor may be a separate low consumption temperature sensor, e.g. a PCT2202 from NXP) for measuring the fluid pressure and the fluid temperature, respectively, of the fluid flow. The turbine 4 comprises a first and a second electrical terminals 13, 14 providing an AC current for powering the flowmeter 2.

The flowmeter 2 further comprises a Power Management System 16 (PMS) to which the terminals 13, 14 of the turbine 4 are connected. The PMS 16 is in charge of maintaining an optimal impedance matching for power transfer between the terminals 13, 14 of the generator of the turbine 4 and the electronic components of the flowmeter 2. The PMS 16 is also connected to a battery 18 for storing electrical energy. In another embodiment, the battery may be replaced or supplemented by a supercapacitor. The PMS 16 is in charge of controlling the electrical system of the flowmeter 2. The PMS 16 determines whether the overall electrical power consumption of the flowmeter 2 is greater or lower than the electrical power generated by the turbine 4. In the first case, the power management system complements the generated electrical power by electrical power stored in the battery 18 for optimal operation of the flowmeter 2. In the second case, the PMS 16 redirects the generated electrical power to the battery 18 for later use. The PMS 16 is also configured to selectively power on or off (uncritical) components of the flowmeter 2, or reduce/increase the duty cycles thereof, based on the power consumption of said components (the power management system may e.g. power off a display or the wireless communication unit of the flowmeter 2 in case of low generated and/or stored electrical power). The PMS 16 provides a power line 20 for (eventually selectively) powering components of the flowmeter 2 such as the pressure sensor 10 and the temperature sensor 12.

Figure 12:
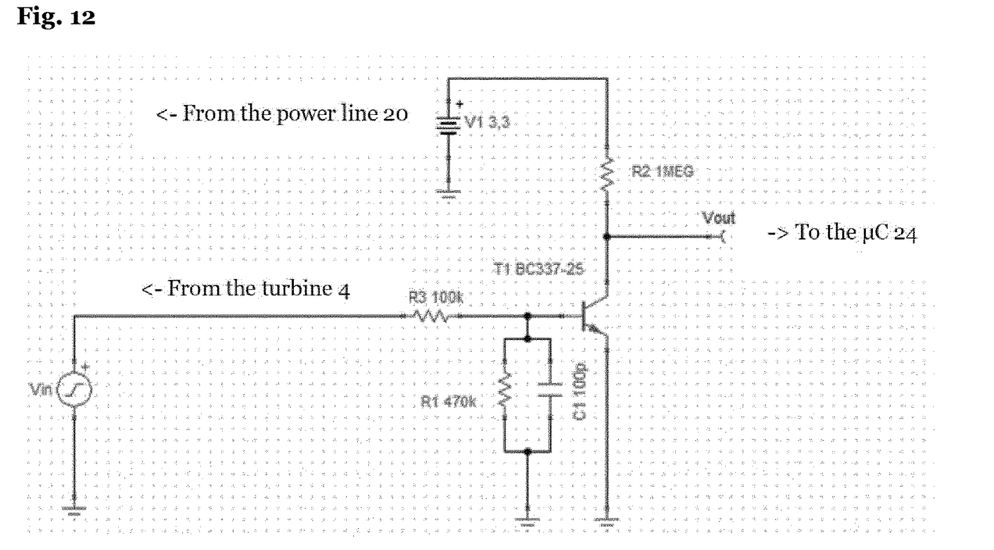
FIG. 12: is a schematic representation of an exemplary implementation of comparator with a digital counter.

The flowmeter 2 also comprises a high input impedance frequency analyzer 22 (e.g. a low consumption PLL chip, e.g. LMC568 from Texas Instruments). The frequency analyzer 22 is connected to the output terminals 13, 14 of the turbine 4 for determining the frequency of the AC current. Alternatively or additionally, a comparator with a digital counter for pre-processing the signal may be provided by either terminal 13 or terminal 14. An example of implementation of such a comparator with digital counter is provided in FIG. 12, wherein the comparator is powered by the power line 20. The comparator provided at its output terminal a digital square signal.

The flowmeter 2 further comprises a microcontroller 24 (μC) which can be implemented as an application-specific integrated circuit (ASIC), as a digital signal processor (DSP) and/or as a field-programmable gate array (FPGA).

The microcontroller 24 is connected to the pressure sensor 10, the temperature sensor 12 and the frequency analyzer 22. The pressure sensor 10, the temperature sensor 12 and the frequency analyzer 22 provide a pressure signal, a temperature signal and a frequency signal, respectively, to the microcontroller 24 through e.g. one or more of its input terminal(s). The microcontroller 24 is configured to determine the permanent pressure loss across the flowmeter 2 based on the frequency signal. The microcontroller 24 is further configured to determine whether the fluid flow in the flowmeter 2 is in the subsonic or in the supersonic regime based on the determined permanent pressure loss and the pressure signal. In addition, the microcontroller 24 is configured to determine the volumetric flow rate of the fluid flow based on the determined permanent pressure loss, the pressure signal, the regime of the flow fluid flow and the temperature signal.

It follows that the electrical power harvested from the fluid flow not only allows providing electrical power for operating the flowmeter 2 but also allows measuring the frequency of the AC current of the turbine 4. This, in turn, allows determining the permanent pressure loss across the flowmeter 2 (see below).

A data logger 26, connected to the microcontroller 24, is also provided for logging time series of the pressure signal, the temperature signal, the permanent pressure loss, the regime of the flow, the volumetric flow rate, and/or the incremental consumption in volume of the fluid.

Furthermore, a display 28 (e.g. a low consumption display (LCD, e-ink or OLED)), connected to the microcontroller 24, is also provided for direct monitoring of the pressure, the temperature, the permanent pressure loss, the regime of the flow and/or the volumetric flow rate by a user.

The pressure signal, the temperature signal, the permanent pressure loss, the regime of the flow and/or the volumetric flow rate, or time series thereof, may be transmitted by a Bluetooth (preferably Low Energy) wireless communication system 30, connected to the microcontroller 24. In other embodiments, the wireless communication system may be a Wi-Fi, a ZigBee or a Z-wave communication system.

Figure 2:
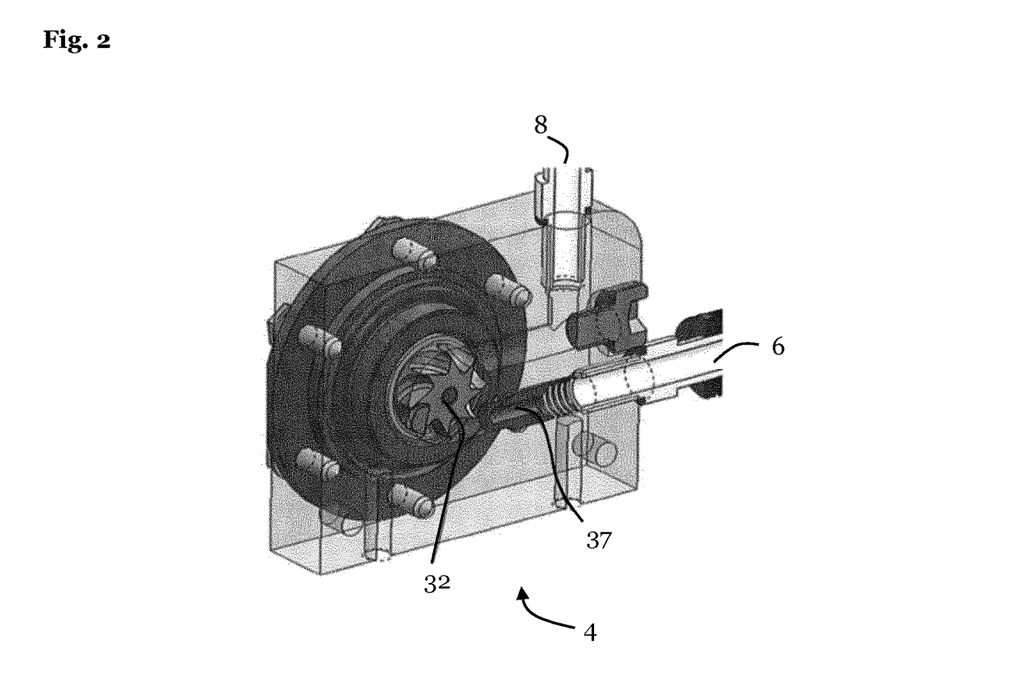
FIG. 2: is a schematic cutaway perspective drawing of the turbine according to a preferred embodiment of the disclosure.
Figure 3:
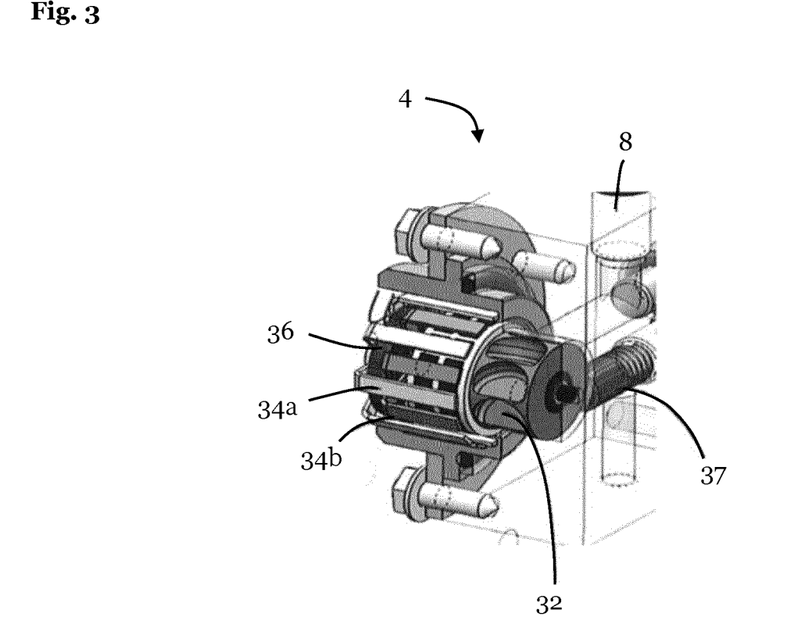
FIG. 3: is a schematic cutaway perspective drawing of a detail of the turbine of FIG. 2 according to a preferred embodiment of the disclosure.
Figure 4:
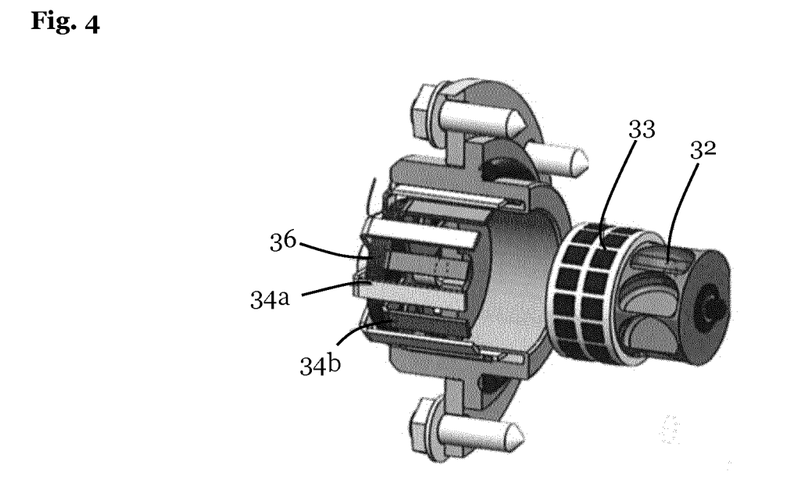
FIG. 4: is a schematic cutaway perspective drawing of a detail of the turbine of FIG. 2 according to a preferred embodiment of the disclosure.

The structure of the turbine 4 according to a preferred embodiment of the disclosure is illustrated in FIGS. 2-4. The turbine 4 comprises a bucket wheel 32 with a multipolar magnetic rotor 33, a double basket structured stator (34a, 34b) and a coil 36. The generator comprises elements 33, 34a and 34b, and 36 as an electromagnetic generator. It should be noted that, in other embodiments, the wheel 32 may be replaced by a paddle wheel, a bucket wheel, a helix, or any other type of wheel. The bucket wheel 32 is housed in the double basket structured stator (34a, 34b) which is connected to a coil 36. The coil 36 provides the AC current at the electrical terminals 13, 14 of turbine 4. The bucket wheel 32 is in fluid communication with the flow inlet 6 and the flow outlet 8. Fluid entering through the flow inlet 6 of the flowmeter 2 is directed to the bucket wheel 32 and induces a rotation thereof. The turbine 4 is configured so that the fluid flow flows around half of turn of the bucket wheel 32 before exiting the bucket wheel 32 and flowing to the flow outlet 8. The rotation of the bucket wheel 32 creates induced current in the coil 36 thereby generating the AC current provided at the electrical terminals 13, 14. It follows that the frequency of AC current determined by frequency analyzer 22 is the rotational frequency of the rotor (i.e. the rotational speed of the bucket wheel 32), or a known (possibly integer) multiple thereof. The frequency analyzer 22 thus senses the rotational speed of the bucket wheel 32. It follows that a separate rotational speed sensor is not necessary for determining the rotational speed of the bucket wheel 32.

The flow inlet 6 and the flow outlet 8 have a diameter preferably comprised in the interval from 2 mm to 15 mm, preferably from 3 mm to 10 mm, more preferably from 4 mm to 7 mm, even more preferably from 4 mm to 6 mm. The flow inlet 6 and the flow outlet 8 may have the same or different diameters.

In an embodiment, no inlet or outlet other than the flow inlet 6 and the flow outlet 8 is arranged in the turbine 4 between the flow inlet 6 and the flow outlet 8. For example, no exhaust holes, venting holes or tapping points (e.g. for measuring the temperature or pressure) are arranged in the turbine 4 between the flow inlet 6 and the flow outlet 8. In other words, the turbine 4 is fluid-tight.

The turbine 4 further comprises a nozzle 37 having a small circular orifice plate. The orifice has a diameter comprised in the interval from 0.1 mm to 1 mm, preferably from 0.2 mm to 0.8 mm, more preferably from 0.4 mm to 0.6 mm, even more preferably of 0.5 mm In other embodiments, the nozzle 37 may have different shape, such as, e.g., a fine throat or a beveled orifice with a well-defined angle.

A cross sectional diameter change in the pipe causes the velocity of the flowing fluid to change. As the flowing fluid passes through the nozzle 37, the restriction (constriction) causes an increase of fluid velocity and a decrease of fluid pressure.

A general expression for computing the volumetric flow rate of a fluid flow flowing through a nozzle is given by:

$$Q = CYA_2 \sqrt{\frac{2g_c(p_1 - p_2)}{(1-\beta^4)\rho_1}}, \quad \text{(Eq. 1)}$$

where Q is the volumetric flow rate, C is the discharge coefficient (~0.6 for a circular orifice plate), Y is the expansion factor (1 for incompressible fluids flows, or ≠1 for compressible fluid flows), $A_2$ is the cross-section surface of the pipe, $g_c$ is a dimensionless constant (1 in SI), $p_1$ is the fluid pressure upstream of the nozzle, $p_2$ is the fluid pressure at the vena-contracta, downstream of the nozzle, β is the ratio between nozzle diameter and the pipe diameter upstream of the nozzle, and $\rho_1$ is the fluid density upstream of the nozzle.

It is well known that the nozzle induces a change of the fluid pressure, fluid temperature and fluid velocity of the fluid and may induce a subsonic to supersonic transition. Also, the nozzle causes a permanent pressure loss. The subsonic to supersonic transition is a point of paramount importance to consider in order to evaluate accurately the volumetric flow rate of a compressible fluid flow.

It is also well-known that increasing the pressure difference of a given subsonic flow between the region upstream and downstream of a constriction (e.g. nozzle) will increase the Mach number of the flow, in particular at the constriction. When the pressure difference increased in such a way that the flow is just at M=1 at the constriction, the flow upstream and downstream of the constriction is at M<1. The flow is called choked since the flow remains at M=1 at the constriction even when further increasing the pressure difference. Further increasing the pressure difference creates a flow in a supersonic regime just downstream of the constriction. It should be noted that the supersonic regime is often called choked regime since the flow remains choked at the constriction.

According to the Standard provided by The International Society of Automation "Flow Equations for Sizing Control Valves" (ISA-75.01.01-2007, 60534-2-1 Mod), the volumetric flow rate $Q_{sub}$ for a subsonic flow may be written as $$Q_{sub}\left(\frac{L}{\min}\right) = \frac{4.17}{60} 1000 \, C_v p_1 \left(1 - \frac{\Delta p}{3 p_1 F_\gamma x_T}\right)\sqrt{\frac{\Delta p}{p_1(T_a + 273.15)}}. \quad \text{(Eq. 2)}$$

Also according to the same reference, the volumetric flow rate $Q_{sup}$ for a supersonic flow may be written as $$Q_{sup}\left(\frac{L}{\min}\right) = \frac{4.17}{60} 1000 \, 0.667 C_v p_1 \sqrt{\frac{F_\gamma x_T}{T_a + 273.15}}. \quad \text{(Eq. 3)}$$

For determining whether the fluid is in the subsonic or in the supersonic regime, the following flow transition criteria is used:

$$\frac{\Delta p}{p_1} - F_\gamma x_T \begin{cases} < 0 \text{ for subsonic regime,} \\ \geq 0 \text{ for supersonic regime} \end{cases} \quad \text{(Eq. 4)}$$

with $T_a$ the fluid temperature in °C., $\Delta p = p_1 - p_2 F_\gamma$ is the specific heat ratio factor of the fluid (e.g. 1.401 for air at room temperature), $x_T$ is the pressure differential ratio factor of a control valve without attached fittings at choked flow and $C_v$ is the flow coefficient.

The flow coefficient $C_v$ may be determined according to Lohm's definition. For a circular orifice plate of diameter d, one has:

$$C_v = C\left(\frac{d}{4.654}\right)^2. \quad \text{(Eq. 5)}$$

According to D. W. Green "Perry's Chemical Engineers' Handbook" (McGraw-Hill, 2008), in particular in Sec. 10 "Transport and Storage of Fluids", Δp is related to the permanent pressure loss $p_1-p_3$, where $p_3$ is the fluid pressure measured downstream, far away from the flowmeter 2, in the following way:

$$\Delta p = p_1 - p_2 = \frac{p_1 - p_3}{1 - \beta^2}. \quad \text{(Eq. 6)}$$

Turning now to the dynamics of the turbine, more particularly of the rotor, the angular equation of motion can be written as (A. Napolitano et al. "A wide range (up to 1010 P) rotating cylinder viscometer", J. Res. Nat. Bur. Stand. -A. Phys. and Chem. 69A(5), p. 449 (1965)):

$$I\frac{d^2\theta}{dt^2} + \eta K_1 \frac{d\theta}{dt} + K_2\sin(m\theta) = K_3(p_1 - p_3), \quad \text{(Eq. 7)}$$

where I is the moment of inertia, θ≡θ(t) is the instantaneous angular position (in radians) of the rotor relatively to the stator, $\eta_f$ is the dynamic viscosity of the fluid, $K_1$ is the "electromagnetic" viscosity (originating from eddy currents), $K_2$ is the cogging torque factor, m is an even integer defining the periodicity of the magnetic cogging torque equals to the number of pair poles of the rotor (33) and stator (34a, 34b) and $K_3$ is the driving torque factor. In order to be easily analytically solved, the equation of motion can be simplified to:

$$I\frac{d^2\theta}{dt^2} + \eta K_1 \frac{d\theta}{dt} + K_2 = K_3(p_1 - p_3), \quad \text{(Eq. 8)}$$

where the periodic cogging term $K_2 \sin(m\theta)$ is replaced by a continuous torque $K_2$ opposite to the rotation. This assumption is justified by considering the dynamic steady state of the constant rotation speed of the generator in the turbine 4, and not the transitory state.

The closed-form solution for the instantaneous rotational speed of the rotor ω(t)=dθ/dt, can be written as:

$$\omega(t) = \frac{K_3}{\eta K_1}[(p_1 - p_3) - \Delta p_{th}]\left[1 - \exp\left(-\frac{\eta K_1}{I}t\right)\right], \quad \text{(Eq. 9)}$$

where $\Delta p_{th}=K_2/K_3$ is a constant for a threshold differential pressure to achieve by the driving flow to initiate the rotation of the rotor.

For t→∞, the instantaneous rotational speed of the rotor ω(t→∞) tends to $$\omega(t \to \infty) = \frac{K_3}{\eta K_1}[(p_1 - p_3) - \Delta p_{th}]. \quad \text{(Eq. 9)}$$

It follows that a linear relationship exists between $(p_1-p_3)$ and the rotational speed ω=ω(t→∞) of the rotor:

$$p_1 - p_3 = \omega \frac{\eta K_1}{K_3} + \Delta p_{th}. \quad \text{(Eq. 10)}$$

The volumetric flow rate for a subsonic flow (see Eq. 2) may therefore be rewritten as $$Q_{sub}\left(\frac{L}{\min}\right) = \frac{4.17}{60}1000 \ C\left(\frac{d}{4.654}\right)^2 p_1 \left(1 - \frac{\omega\frac{\eta K_1}{K_3} + \Delta p_{th}}{3(1-\beta^2)p_1 F_\gamma x_T}\right) \sqrt{\frac{\omega\frac{\eta K_1}{K_3} + \Delta p_{th}}{(1-\beta^2)p_1(T_a+273.15)}}, \quad \text{(Eq. 11)}$$

and the volumetric flow rate for a supersonic flow (see Eq. 3) may also be rewritten as $$Q_{sup}\left(\frac{L}{\min}\right) = \frac{4.17}{60}1000 \cdot 0.667 \ C\left(\frac{d}{4.654}\right)^2 p_1 \sqrt{\frac{F_\gamma x_T}{T_a+273.15}}. \quad \text{(Eq. 12)}$$

Experimental Confirmation of the Models of Eqs. 2, 3

Figure 5:
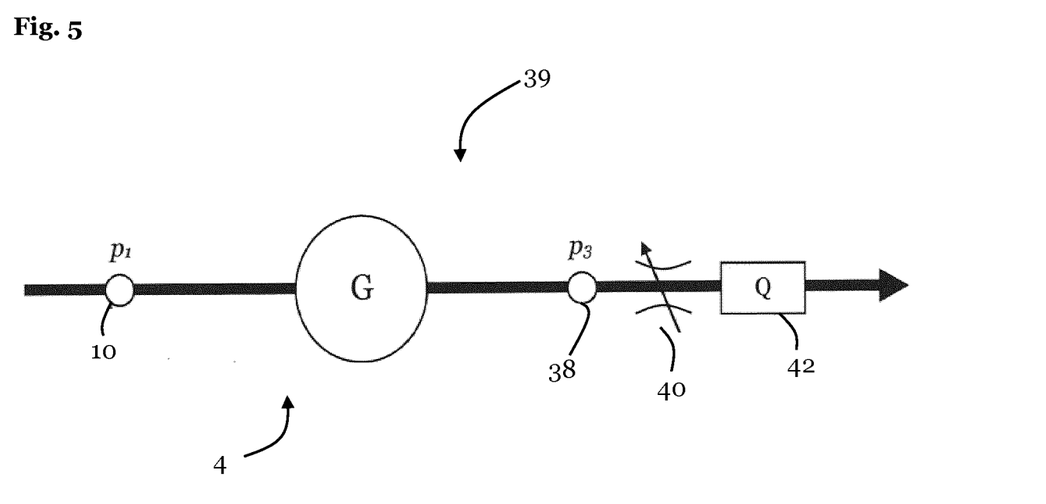
FIG. 5: is a schematic representation of a test bench for testing the turbine.

With reference to FIG. 5, the turbine 4 is placed on a test bench 39 comprising a pressure sensor 38 for measuring the fluid pressure $p_3$. The test bench 39 further comprises a micro leak valve 40, arranged downstream from the pressure sensor 38, and a flowmeter 42 for measuring the flow rate Q. The micro leak valve 40 allows for accurately setting the volumetric flow rate. The turbine 4 also comprises, at its flow inlet, a temperature sensor which is not represented in FIG. 5. The fluid is air with $T_a=20°$ C.

Figure 6:
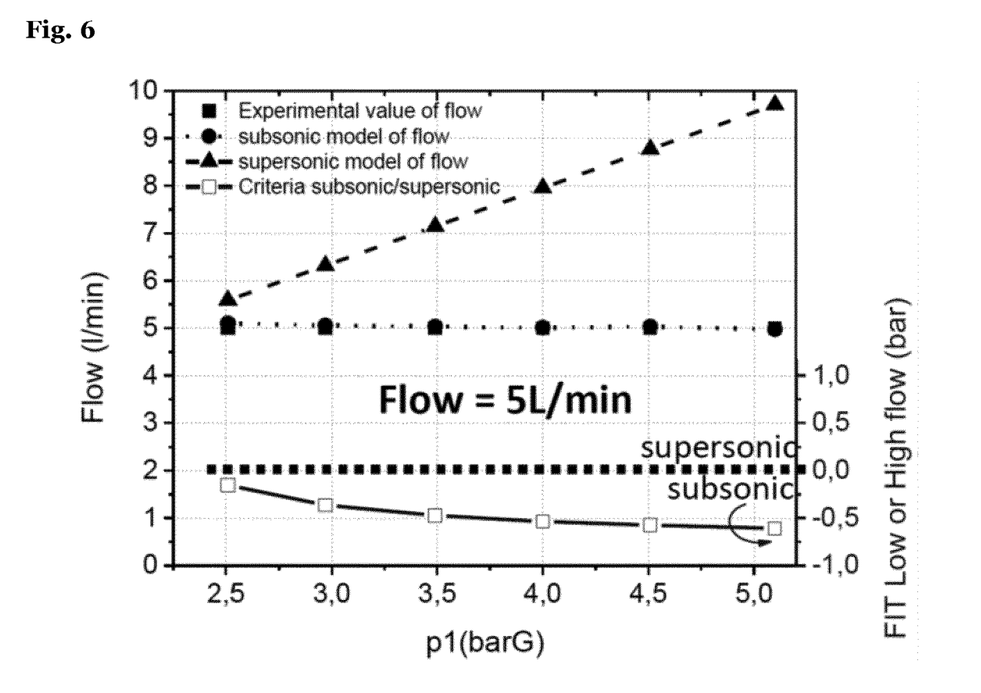
FIG. 6: shows a comparison between flow rates measured by the test bench and predicted by the subsonic or supersonic model described hereinbelow, the flow rate being maintained at 5 L/min.
Figure 7:
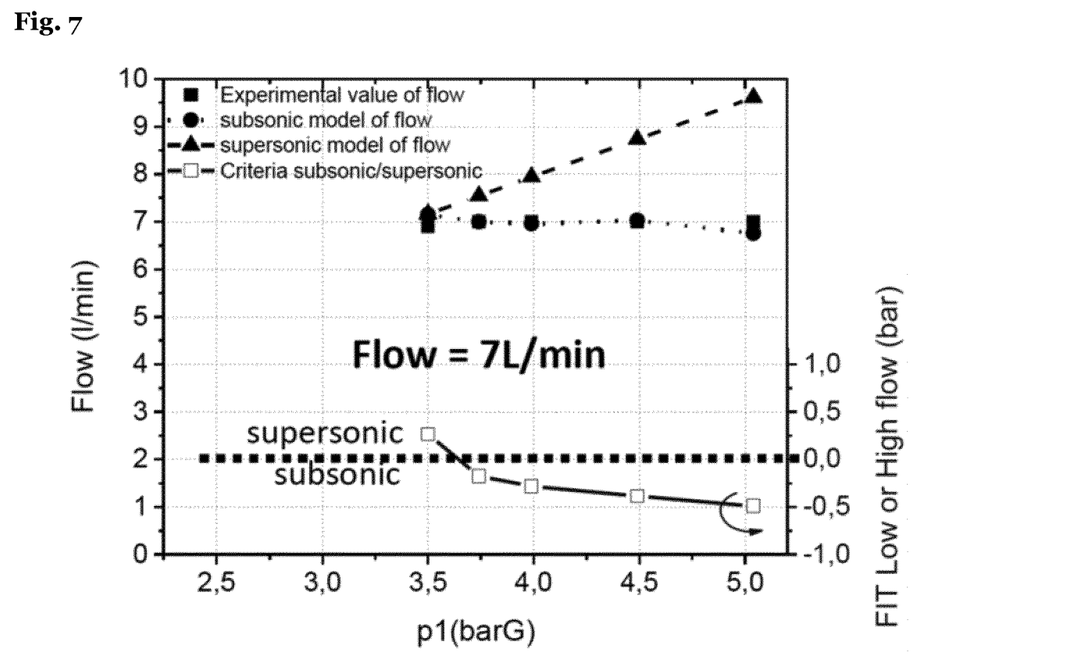
FIG. 7: shows a comparison between flow rates measured by the test bench and predicted by the subsonic or supersonic model described hereinbelow, the flow rate being maintained at 7 L/min.

FIGS. 6, 7 show the measured volumetric flow rates, set constant by the mean of the manual micro leak valve (Q=5 L/min for FIG. 6 and Q=7 L/min for FIG. 7), as a function of fluid pressure $p_1$ at the inlet. The black squares are the experimental data. The volumetric flow rate is also computed according to the subsonic model (Eq. 2—dotted curve, circle symbols) and the supersonic model (Eq. 3—dashed curve, triangle symbols). In addition, the flow transition criteria (Eq. 4) is also shown (solid curve, hollow square symbols) in the lower panel of each graph for visualizing the corresponding subsonic/supersonic transition. The subsonic model (Eq. 2) allow predicting accurately the volumetric flow rate Q based on $p_1$, $p_3$ and $T_a$. The supersonic model (Eq. 3) also allows predicting the volumetric flow rate Q in the case of a supersonic flow.

Figure 8:
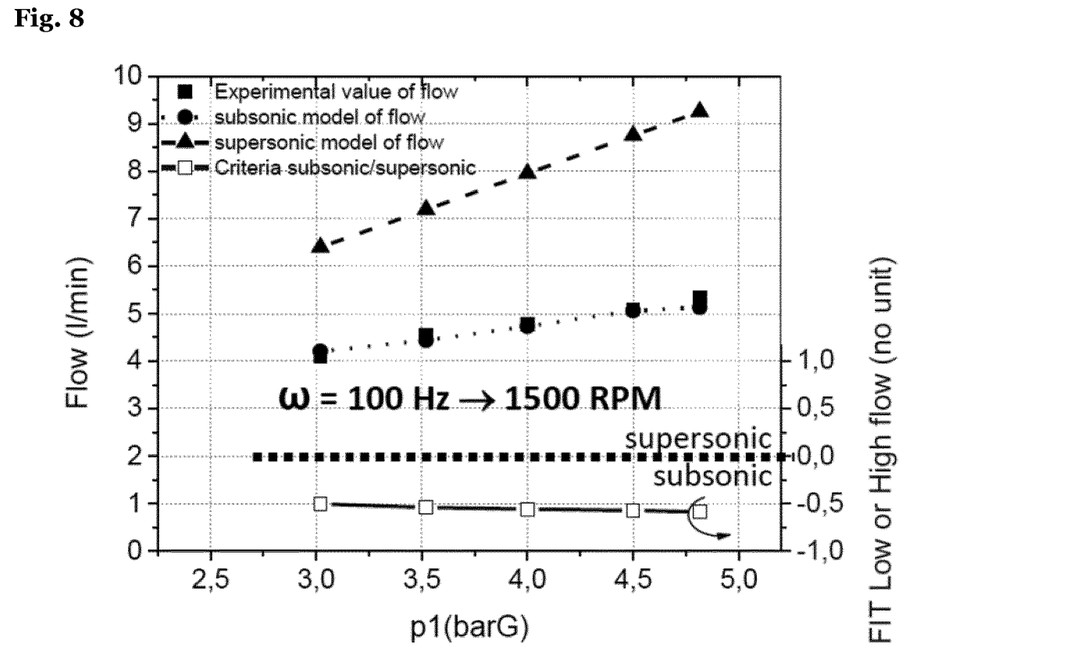
FIG. 8: shows a comparison between flow rates measured by the test bench and predicted by the subsonic or supersonic model described hereinbelow, the rotational speed of the rotor being maintained at 100 Hz.
Figure 9:
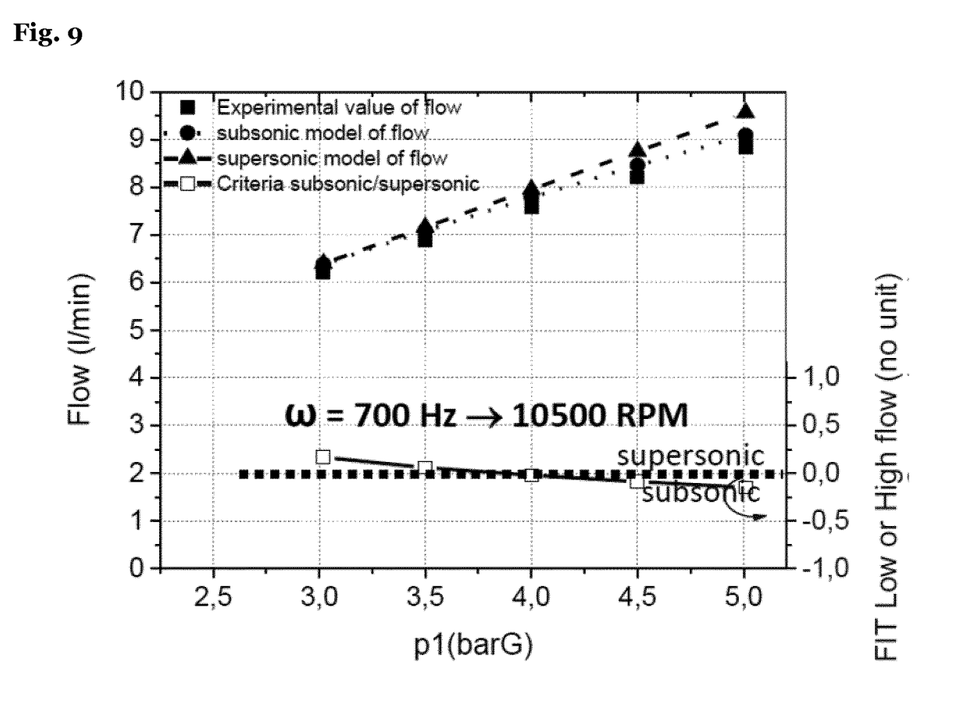
FIG. 9: shows a comparison between flow rates measured by the test bench and predicted by the subsonic or supersonic model described hereinbelow, the rotational speed of the rotor being maintained at 700 Hz.

FIGS. 8, 9 show the measured volumetric flow rates as a function of fluid pressure $p_1$ at the inlet for a constant rotational speed of the rotor. The rotational speed of the rotor is determined in the same way as described in the embodiment illustrated in FIG. 1. The rotational speed of the rotor is maintained constant by the means of the manual micro leak valve. The black squares are the experimental data. The volumetric flow rate is also computed according to the subsonic model (Eq. 2—dotted curve, circle symbols) and the supersonic model (Eq. 3—dashed curve, triangle symbols). In addition, the flow transition criteria (Eq. 4) is also shown (solid curve, hollow square symbols) in the lower panel of each graph for visualizing the corresponding subsonic/supersonic transition. The same conclusions as in FIGS. 6, 7 can be drawn for FIGS. 8, 9, i.e. that the subsonic model (Eq. 2) allows predicting accurately the volumetric flow rate Q based on $p_1$, $p_3$ and $T_a$. The supersonic model (Eq. 3) also allows predicting the volumetric flow rate Q in the case of a supersonic flow.

To sum up, the analytical models of Eqs. 2, 3 accurately reproduce the experimental data.

Experimental Confirmation of the Model of Eq. 9 and Eq. 10

Figure 10:
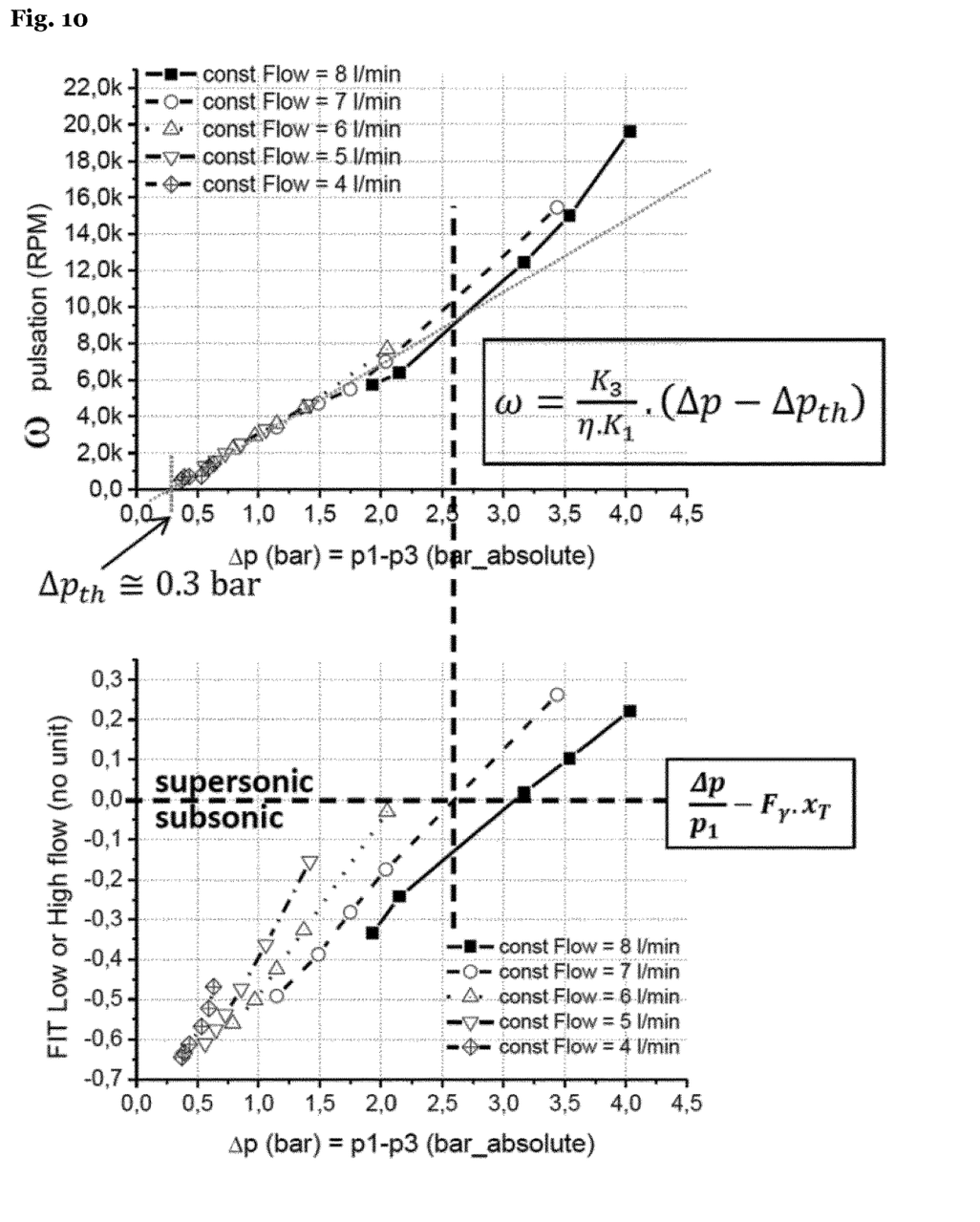
FIG. 10: shows the relation between the measured and predicted rotational speed of the rotor as a function of the permanent pressure loss.

The turbine 4 is placed on the test bench 39. FIG. 10 shows the measured rotational speed of the rotor as a function of permanent pressure loss $p_1$-$p_3$ for constant volumetric flow rates Q. The fluid is air with $T_a$=20° C. The flow transition criteria (Eq. 4) is also shown in the lower panel in order to highlight the subsonic to supersonic transition of the compressible fluid flow. A linear relationship between the permanent pressure loss and the rotational speed of the rotor is obtained for the subsonic regime and for any volumetric flow rate. The data points were fitted by equation (9) which allowed to determine that $\Delta p_{th} \approx 0.3$ bar and that $K_3/(\eta K_1) \approx 3950.93$ rad.$s^{-1}$bar$^{-1}$.

Electrical Power Delivered by the Turbine

Figure 11:
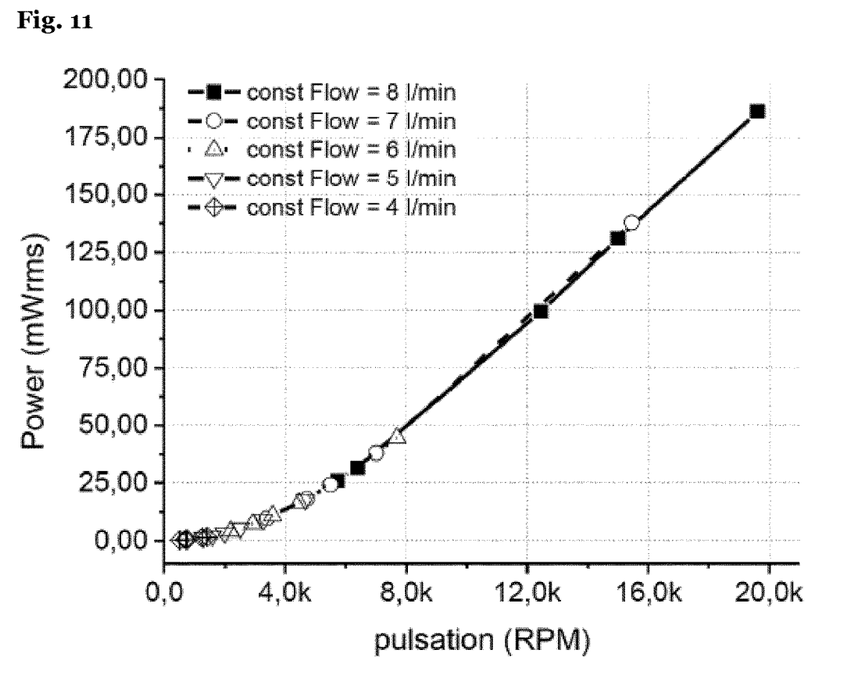
FIG. 11: shows the RMS power produced by the turbine as a function of the rotational speed of the rotor.

FIG. 11 shows the electrical power delivered by the turbine 4 as a function of the rotational speed (pulsation (RPM), also noted ω) of the rotor. The figure shows that an electrical power close to 200 milliWatts (rms) can be provided for rotational speed of 20 kiloRPM. Such electrical power would be sufficient to power a flowmeter as illustrated in FIG. 1.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the disclosure, which is to be given the full breadth of the appended claims and any and all equivalents thereof.

The invention claimed is:

1. A method for determining the volumetric flow rate of a compressible fluid flow flowing through a volume flowmeter having a flow inlet, and a wheel downstream of the flow inlet, the compressible fluid flowing through the flow inlet and actuating the wheel, comprising:
   measuring a rotational speed of the wheel;
   determining a permanent pressure loss across the wheel based on the measured rotational speed;
   measuring a fluid pressure of the compressible fluid flow at the flow inlet;
   determining whether the compressible fluid flow in the volume flowmeter is in a subsonic or in a supersonic regime based on the determined permanent pressure loss and the measured fluid pressure;
   measuring a fluid temperature of the compressible fluid flow at the flow inlet; and
   determining the volumetric flow rate of the compressible fluid flow based on the determined permanent pressure loss, the measured fluid pressure, the regime of the compressible fluid flow and the measured fluid temperature.

2. The method according to claim 1, comprising powering the volume flowmeter by at least one of a battery and a supercapacitor.

3. The method according to claim 1, comprising powering the volume flowmeter with energy harvested from the compressible fluid flow by a turbine, the turbine comprising the wheel and a generator, the wheel being operatively connected to the generator.

4. The method according to claim 1, comprising transmitting at least one of the measured rotational speed of the wheel, the measured fluid pressure and the measured fluid temperature.

5. The method according to claim 1, comprising transmitting at least one of the measured rotational speed of the wheel, the determined volumetric flow rate, the measured fluid pressure, the regime of the compressible fluid flow, the measured fluid temperature and a cumulative volume through the volume flowmeter, and time series thereof.

6. A volume flowmeter for determining the volumetric flow rate of a compressible fluid flow comprising:
   a flow inlet for the compressible fluid flow, the flow inlet comprising a pressure sensor and a temperature sensor for measuring the fluid pressure and the fluid temperature, respectively, of the compressible fluid flow;
   a wheel, in fluid communication with the flow inlet, the wheel being configured for being actuated by the compressible fluid flow;
   a rotational speed sensor for measuring the rotational speed of the wheel; and
   a controller configured for determining:
      a permanent pressure loss across the wheel based on a rotational speed measured by the rotational speed sensor;
      whether the compressible fluid flow in the volume flowmeter is in a subsonic or in a supersonic regime based on the determined permanent pressure loss and the measured fluid pressure by the pressure sensor; and
      a volumetric flow rate of the compressible fluid flow based on the determined permanent pressure loss, the measured fluid pressure by the pressure sensor, the determined regime of the compressible fluid flow and the measured fluid temperature by the temperature sensor.

7. The volume flowmeter according to claim 6, comprising a wheel bypass arrangement for bypassing the wheel.

8. The volume flowmeter according to claim 7, wherein the wheel bypass arrangement comprises a valve for selectively opening and closing the bypass.

9. The volume flowmeter according to claim 6, comprising a turbine for powering the volume flowmeter, the turbine comprising the wheel and a generator, the wheel being configured to be operatively connected to the generator.

10. The volume flowmeter according to claim 6, comprising at least one of a battery and a supercapacitor configured for powering the volume flowmeter.

11. The volume flowmeter according to claim 6, comprising a power management system.

12. The volume flowmeter according to claim 6, comprising a wireless communication system.

13. The volume flowmeter according to claim 12, wherein the wireless communication system comprises at least one of a Bluetooth, a ZigBee, a Z-wave and a Wi-Fi communication system.

14. The volume flowmeter according to claim 12, wherein the wireless communication system comprises a Bluetooth Low Energy communication system.

15. The volume flowmeter according to claim 6, comprising a GNSS receiver for providing at least one of geolocation and time.

16. The volume flowmeter according to claim 6, wherein the rotational speed sensor comprises at least one of a phase-locked loop (PLL) control system and a comparator with a digital counter for measuring the rotational speed of the wheel.

17. A computer-readable medium with a non-volatile memory having stored therein a computer program comprising instructions to cause a controller for a volume flowmeter according to claim 11 to execute the steps of:
- determining the permanent pressure loss across the wheel based on the measured rotational speed;
- determining whether the compressible fluid flow in the volume flowmeter is in the subsonic or in the supersonic regime based on the determined permanent pressure loss and the measured fluid pressure at the flow inlet; and
- determining the volumetric flow rate of the compressible fluid flow based on the determined permanent pressure loss, the measured fluid pressure, the regime of the flow compressible fluid flow and the measured fluid temperature.

18. The volume flowmeter according to claim 6, comprising a constriction arranged downstream of the flow inlet and upstream of the wheel, the wheel being in fluid communication with the flow inlet via the constriction.

19. The volume flowmeter according to claim 18, wherein the constriction is a nozzle.

20. A data processing device for controlling a volume flowmeter, comprising:
- one or more signal input terminals for receiving fluid pressure and fluid temperature signals of a compressible fluid flow at a flow inlet of the volume flowmeter as well as a rotational speed signal of a wheel of the volume flowmeter; and
- a controller configured for determining:
  - a permanent pressure loss across the wheel based on the rotational speed signal;
  - whether the compressible fluid flow in the volume flowmeter is in a subsonic or in a supersonic regime based on the determined permanent pressure loss and the fluid pressure signal; and
  - a volumetric flow rate of the compressible fluid flow based on the determined permanent pressure loss, the fluid pressure signal, the determined regime of the compressible fluid flow and the fluid temperature signal.

* * * * *